United States Patent
Lemke et al.

(10) Patent No.: US 6,393,199 B1
(45) Date of Patent: May 21, 2002

(54) APPARATUS AND METHOD FOR HIGH SPEED RECORDING OF VIDEO SIGNALS

(75) Inventors: James U. Lemke, San Diego; James C. Crosby, Rancho Santa Fe; Robert E. Monteleone, Poway; William W. French, Cardiff, all of CA (US)

(73) Assignee: Recording Physics, Inc., San Diego, CA (US)

( * ) Notice: Subject to any disclaimer, the term of this patent is extended or adjusted under 35 U.S.C. 154(b) by 0 days.

(21) Appl. No.: 09/040,922

(22) Filed: Mar. 18, 1998

Related U.S. Application Data

(60) Provisional application No. 60/041,023, filed on Mar. 20, 1997.

(51) Int. Cl.[7] .................................................. H04N 5/76
(52) U.S. Cl. .............................. 386/67; 386/96; 386/99
(58) Field of Search ........................... 386/416–18, 39, 386/52, 54, 64, 67, 68, 75, 81, 97–98, 96, 99; 360/13, 15, 108; 369/86, 84, 85; H04N 5/76, 5/92, 5/91, 9/79

(56) References Cited

U.S. PATENT DOCUMENTS

| | | | | |
|---|---|---|---|---|
| 3,666,893 A | * | 5/1972 | Fujiwara et al. | 360/66 |
| 4,214,284 A | * | 7/1980 | Mussatt | 360/72.1 |
| 4,872,070 A | * | 10/1989 | Cooper et al. | 360/15 |
| 4,888,653 A | * | 12/1989 | Cullum | 360/15 |
| 5,260,800 A | * | 11/1993 | Sturm et al. | 360/32 |
| 5,515,220 A | * | 5/1996 | Alioth | 360/108 |
| 5,636,311 A | * | 6/1997 | Nakatani | 386/4 |
| 5,647,047 A | * | 7/1997 | Nagasawa | 386/52 |
| 5,739,986 A | * | 4/1998 | Van Vlerken et al. | 360/108 |
| 6,052,241 A | * | 4/2000 | Teranishi | 360/48 |
| 6,181,498 B1 | * | 1/2001 | Kikuchi et al. | 360/48 |

* cited by examiner

Primary Examiner—Thai Tran
(74) Attorney, Agent, or Firm—Daniel Robbins

(57) ABSTRACT

A helical scan tape recorder records VHS video and audio at speeds up to 40x the playback speed of a standard VHS VCR. The recorder employs a high speed scanner operating in a helical scan mode. Input signals feed the scanner through a capacitive coupler. For VHS recording, the scanner has 32 heads mounted on its periphery; 16 video heads and 16 audio heads. An external source of video and associated audio provides 8 channels each of video and audio, and each channel drives 2 heads in parallel. During a half rotation of the scanner, heads fed from the 8 channels contact the tape and are recorded, and during the next half rotation the other group of 8 heads are similarly recording. The audio is delayed so that a segment of video records over its associated audio segment.

20 Claims, 8 Drawing Sheets

HEAD DRIVER PRINTED CIRCUIT BOARD, BOTTOM SIDE

BOTTOM SIDE

HEAD DRIVER PRINTED CIRCUIT BOARD, TOP SIDE

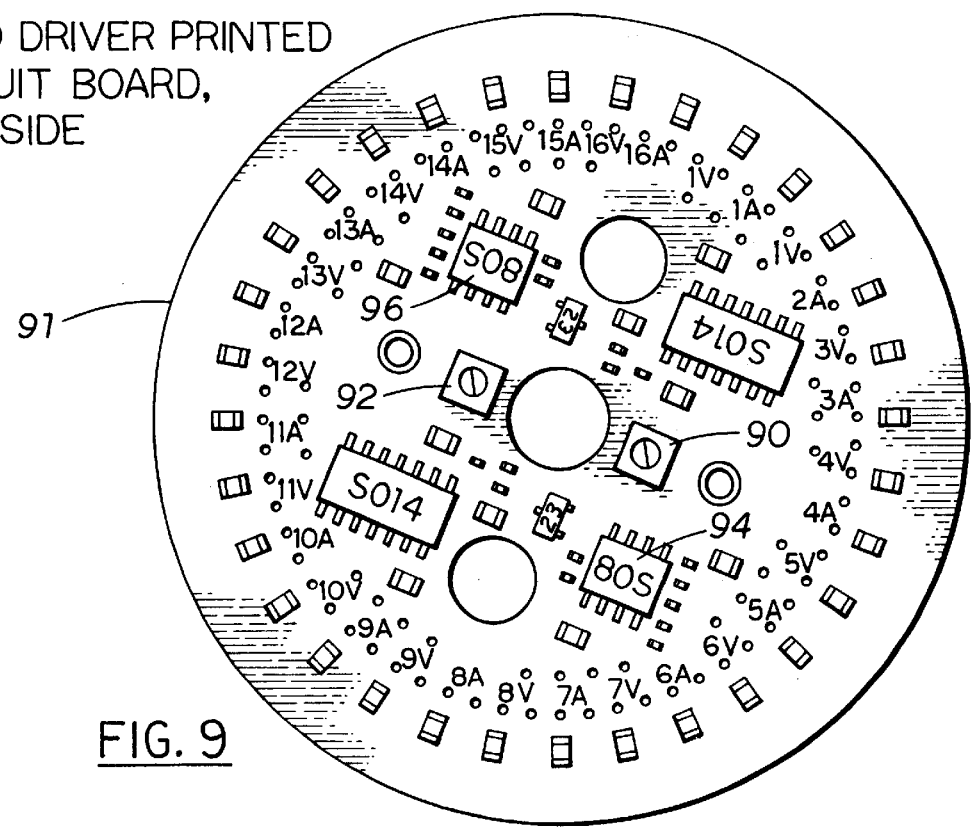

FIG. 9

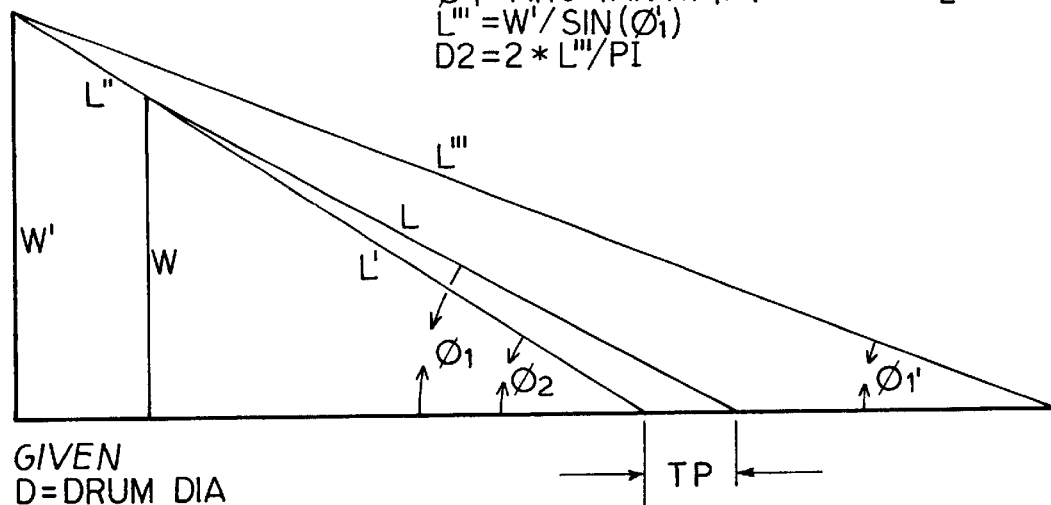

$L = PI * D/2$
$W = L * SIN(\emptyset_1)$
$L' = W/SIN(\emptyset_2)$
$L'' = L * H2/H1$ $TP = L * COS(\emptyset_1) - L' * COS(\emptyset_2)$
$T = 8 * TP$
$W' = L'' * SIN(\emptyset_2)$
$\emptyset'_1 = ARC\ TAN(W'_1/(L'' * COS(\emptyset_2) + T))$
$L''' = W'/SIN(\emptyset'_1)$
$D2 = 2 * L'''/PI$ GIVEN
D = DRUM DIA
$\emptyset_1$ = ANSI STD
$\emptyset_2$ = ANSI STD
$H_1$ = 262.5 LINES
$H_2$ = 276 LINES

GEOMETRY FOR CALCULATION OF DRUM DIAMETER

FIG. 10

HELIX ANGLE CALCULATIONS FOR 40X RECORDER-NTSC FORMAT

| Description | Value | Units |
|---|---|---|
| NTSC drum diameter, from standard and as measured | 62 | mm |
| Distance L traversed by head in $180° = \pi *$ diameter/2 | 97.38937226 | mm |
| Fence angle, $\emptyset 1$, NTSC, radians, from standard | 0.103592078 | rad |
| Tape angle, $\emptyset 2$, NTSC, radians from standard | 0.104185975 | rad |
| Width, W, of tape traversed in 180° rotation = $L/\sin \emptyset 1$ | 10.07073288 | mm |
| Distance, L', written along tape = $W/\sin \emptyset 2$ | 96.83621152 | mm |
| Track pitch calculated from L & L', $L\cos\emptyset 1 - L'\cos\emptyset 2$ | 0.556159308 | mm |
| Track pitch, T, in 180° in MVS = 8 * standard NTSC | 4.449274466 | mm |
| H lines that must fit into L' from standard | 262.5 | lines |
| H lines required to make H timing continuous MVS | 276 | lines |
| Length, L", of written track for 276 H = L' * 276/262.5 | 101.8163595 | mm |
| Width, W', of tape traversed in 180° = L" * $\sin\emptyset 2$ | 10.58865628 | mm |
| New $\emptyset 1$', fence, = atan(W' (T + L" * $\cos\emptyset 2$)) | 0.099830701 | radians |
| Distance head has to go in 180° to write L'" = W" $\sin\emptyset 1$" | 106.2425157 | mm |
| Diameter of drum that results = L'" * $2/\pi$ | 67.63608614 | mm |
| Ratio, total change in diameter | 1.090904615 | ratio |
| Track width $\mu m$ = 1000/8 * track pitch * $\sin(\emptyset 2)$ | 57.83922918 | $\mu m$ |
| Fence angle in ° | 5.719877832 | ° |
| Fence angle in ° | 5°43'11.56" | |
| Diffence in fence angles, 40X vs. standard speed | 12'55.84" | |

FIG. 11

APPARATUS AND METHOD FOR HIGH SPEED RECORDING OF VIDEO SIGNALS

This application claims the benefit of U.S. Provisional Application No. 60/041,023 filed Mar. 20, 1997.

BACKGROUND OF THE INVENTION

1. Field of the Invention

This invention relates to a very low cost magnetic recording apparatus and method, and in particular to an apparatus and. method for high speed recording of video signals.

2. Description Relative to the Prior Art

The search for high speed, efficient reproduction of magnetic tape cassettes is driven by the continually growing market for home viewing movies. Home movie watching, which is almost exclusively serviced by VHS machines, requires an ongoing stream of movie titles recorded on magnetic tape cassettes. The bulk of the market is tape rentals, and to satisfy the voracious appetite of this market, considerable effort has been expended in attempts to speed up the reproduction of movie cassette tapes by use of higher tape speeds during the reproducing process.

A limited number of systems is known in the art for writing videotaped information at speeds greater than the normal playback speeds. For example, U.S. Pat. No. 4,872,070 to Cooper et al. describes a system and method for high speed videotape reproduction. The source of the video information for reproduction is from a laser disc player which is specially equipped with two optical read heads. The optical disc player also rotates the disc at twice the standard speed allowing information to be read from the optical disc at four times its standard playback rate. In a similar fashion, the helical scan videotape recorder unit has two write head pairs for writing the video information on the videotape in parallel while the tape is moved at twice its normal speed thus producing a 4× write capability. This system lacks the ability to write videotapes at higher than four times their normal viewing speed and requires that the video information come from a video disc player. Although two parallel video signal paths are described, the system lacks the ability to decompress video images from a compressed video file format.

Another system known in the art for writing videotape at a speed faster than the normal viewing speed is found in U.S. Pat. No. 5,065,258 to Warren et al. This system is an analog to analog system in which an analog videotape is played at a higher than normal speed and the signals therefrom are recorded by a second video recorder at the same higher than normal viewing speed. This system lacks the ability to write videotapes at more than twice the normal viewing speed and lacks the ability to process parallel streams of video data from a compressed file format.

Another type of video duplication device is shown in U.S. Pat. No. 5,260,800 to Sturm et al. This system duplicates video cassette tapes at twice the normal viewing speed. The source video information comes from modified video disc players which operate at twice the normal NTSC video format speed. The video and audio information is converted to analog signals which are written at twice the normal viewing speed by a modified VHS video cassette recorder. This system lacks the ability to duplicate a videotape at anything more than twice the normal viewing speed and operates only in the analog domain. This system lacks the ability to write video cassette tapes using parallel data streams of compressed data from a digitally encoded file.

It is most desirable to duplicate a 2 hour tape in about 3 minutes. This requires a 40× speed up. It is not possible to just speed up the drum speed and tape advance speed 40× on a conventional VCR for a number of reasons including: The drum speed would be 72,000 rpm and the highest signal frequency would be about 200 MHZ, a frequency that would not pass the rotary transformer nor record with conventional heads. Solutions to this problem have been accomplished by some professional "D" class recorders wherein parallel heads have been used to keep the head drum speed to reasonable speeds. Typically, such recorders sell for hundreds of thousands of dollars and employ very expensive coaxial, high-frequency rotary magnetic transformers, or coaxial capacitive couplers as described in U.S. Pat. No. 4,870,522 issued in the name of Lelandais.

SUMMARY OF THE INVENTION

The recorder of the invention accepts 16 parallel inputs of information; 8 video inputs and 8 high fidelity audio inputs) both appropriately time interlaced, and records them in VHS, PAL, SECAM or other helical scan formats on a cassette tape moving at 40× the normal play speed. A decompression engine which converts an MPEG-2 movie data stream into 8 parallel video/audio outputs is the preferred source of signal for the presently disclosed recorder. Such a decompression engine is described in U.S. Provisional Application, Ser. No. 60/013,805, filed Mar. 21, 1996. The preferred tape recorded format is the VHS format, and the present specification discloses the invention in terms of hi-speed recording a tape cassette for playback in a VHS recorder. One skilled in the art following the teachings of the. invention can readily determine the geometrical equivalent changes to a PAL or SECAM helical scan recorder to achieve equivalent high speed recording. The tape recorded by the VHS compatible recorder of the invention is indistinguishable from a tape recorded on a standard VHS VCR; the tape is fully compatible for playback on such a standard VHS VCR. A VHS tape of a movie having a 120 minute play time is recorded by the disclosed 40× speed recorder in 3 minutes. The video inputs feed 16 video record heads mounted on a scanner rotating at 5× the normal scanner playback rotational frequency, and the high fidelity audio inputs feed 16 audio record heads alternating in position with the video record heads around the periphery of the scanner. The video and audio signals are fed to the rotating heads through a capacitive disk coupler having 16 facially opposed rings with inter-ring shielding. The scanner rotates between an upper cylinder, and a lower cylinder having a helical fence for guiding the tape, and in half a revolution of the scanner 8 fields of video and high fidelity audio information are recorded as 8 slant tracks, with the video recorded on top of its associated audio information. The recording is compatible with playback on a standard VHS VCR operating at normal playback speed.

Integrated circuit head drive amplifiers mounted on the scanner are powered by an ac/dc converter fed by an ac source coupled to the scanner through a rotary transformer.

Rapid acceleration of the tape to 40× speed is implemented by means of a capstan-pinch roll assembly cooperative with a tape tension controlled supply reel servo and take up reel servo slaved to the supply reel servo. The 40× tape speed mandates a 2.4 MHz bias frequency for conventional audio recording on the VCR audio edge tracks, which is 40 times the normal 60 KHz audio bias frequency. In a VHS VCR the audio bias oscillator is also used as the excitation driving a full tape width erase head, but in the recorder of the invention the corresponding 2.4 MHz audio bias frequency cannot be used as the erase signal as the power dissipation in the erase head rapidly increases with frequency resulting in possible overheating of the erase head and tape. A separate oscillator in the frequency range of from 180 KHz to 400 KHz is used for erasure. Additionally, a tape header containing administrative information may be recorded on the edge audio track using frequency shift keying modulation.

In the NTSC format there are 262.5 H lines per field. The SMPTE specification for VHS recorded video requires at least an additional 9 H lines at the start of each field, so the standard spec requires at least 271.5 H lines per field in a VHS recording. The 40× recorder requires the addition of at least 13.5 H lines (rather than just 9 H lines) for a total of 276 H lines per field to be recorded by the recorder of the present invention, as will be explained below.

Accurate tape guiding at the 40× speed is critical, and provision is included for adjustment of the tape guides to provide clean, non-amplitude modulated signal envelopes during operation. To accomplish this, two of the scanner record heads are switchable from their record amplifiers to reproduce amplifiers also mounted on the scanner. During test, a test tape is played back and the reproduced signals checked for uniformity and amplitude stability. The guides are then adjusted so that tape tracking results in acceptable signal envelopes.

BRIEF DESCRIPTION OF THE DRAWINGS

The invention will be described with respect to the figures of which:

FIG. 9 is a layout drawing of the playback amplifier board of the recorder, FIG. 10 illustrates the geometry and the equations determining the scanner parameters, and FIG. 11 lists the results of calculations utilizing the equations of FIG. 10.

DESCRIPTION OF THE PREFERRED EMBODIMENT

The prototype recorder of the invention has been constructed using the standard mechanism of a Panasonic Model DS 850 professional quality VHS machine. Only some mechanical elements of the Panasonic machine, e.g. cassette loader, pinch roller and capstan assemblies have been used for convenience in development of the present invention. Additionally, the input and output guide pin angles have been modified. The electronics, scanner and cylinder drums, reel servos and other features disclosed in this specification are inventive elements of the present recorder.

Figure 1A:
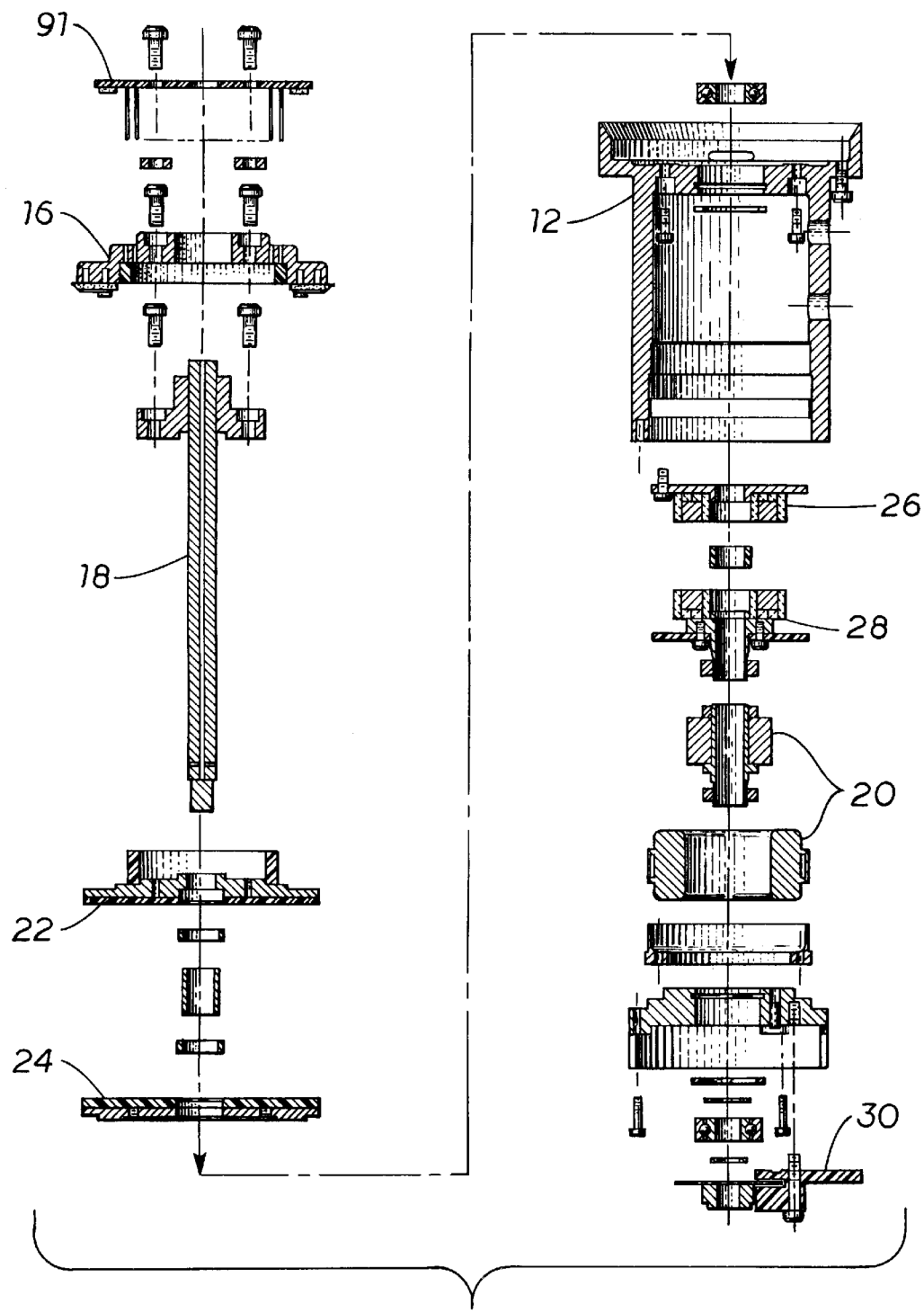
FIGS. 1A, 1B are exploded view drawings of the recorder's drum assembly.
Figure 1B:
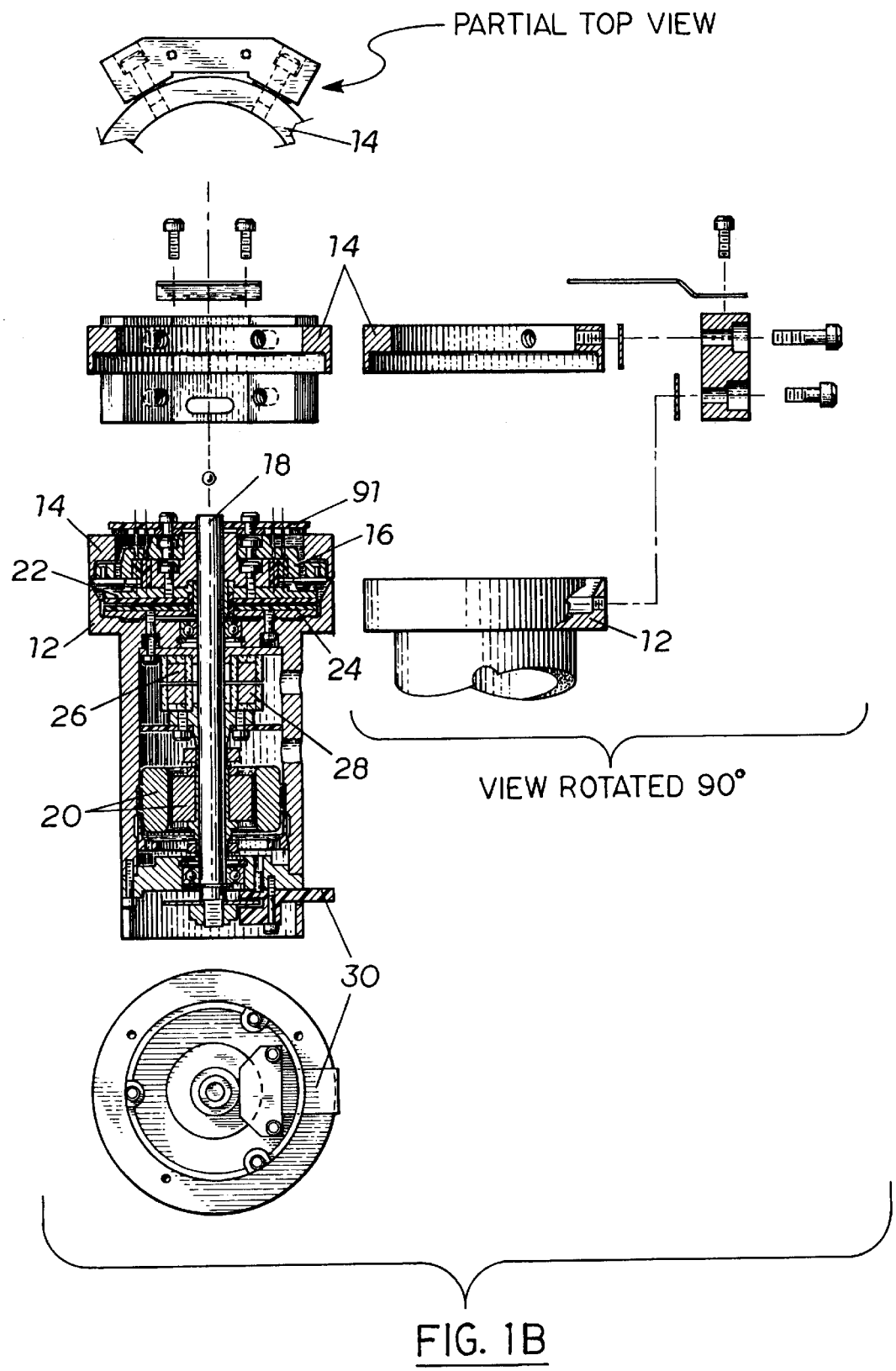

Referring to FIG. 1, the drum assembly 10, contains a lower stationary drum 12, and an upper stationary drum 14. A scanner assembly 16 rotates between the upper drum 14 and the lower drum 12. The scanner assembly 16 is driven by a shaft 18 connected to a motor 20 mounted in the lower stationary drum 12. A capacitive coupler having a fixed plate 24 and a rotating plate 22 couple the video and audio signals to the heads mounted on the scanner 16. A transformer having a rotating assembly 28 coupled to the shaft 18 and a fixed assembly 26 provide ac to a printed circuit board on rotating assembly 28 where it is rectified and the dc provides power to the record and playback amplifiers mounted on the scanner 16. An encoder 30 rotating with the scanner 16 provides rotational speed and phase information of the scanner 16.

Figure 2:
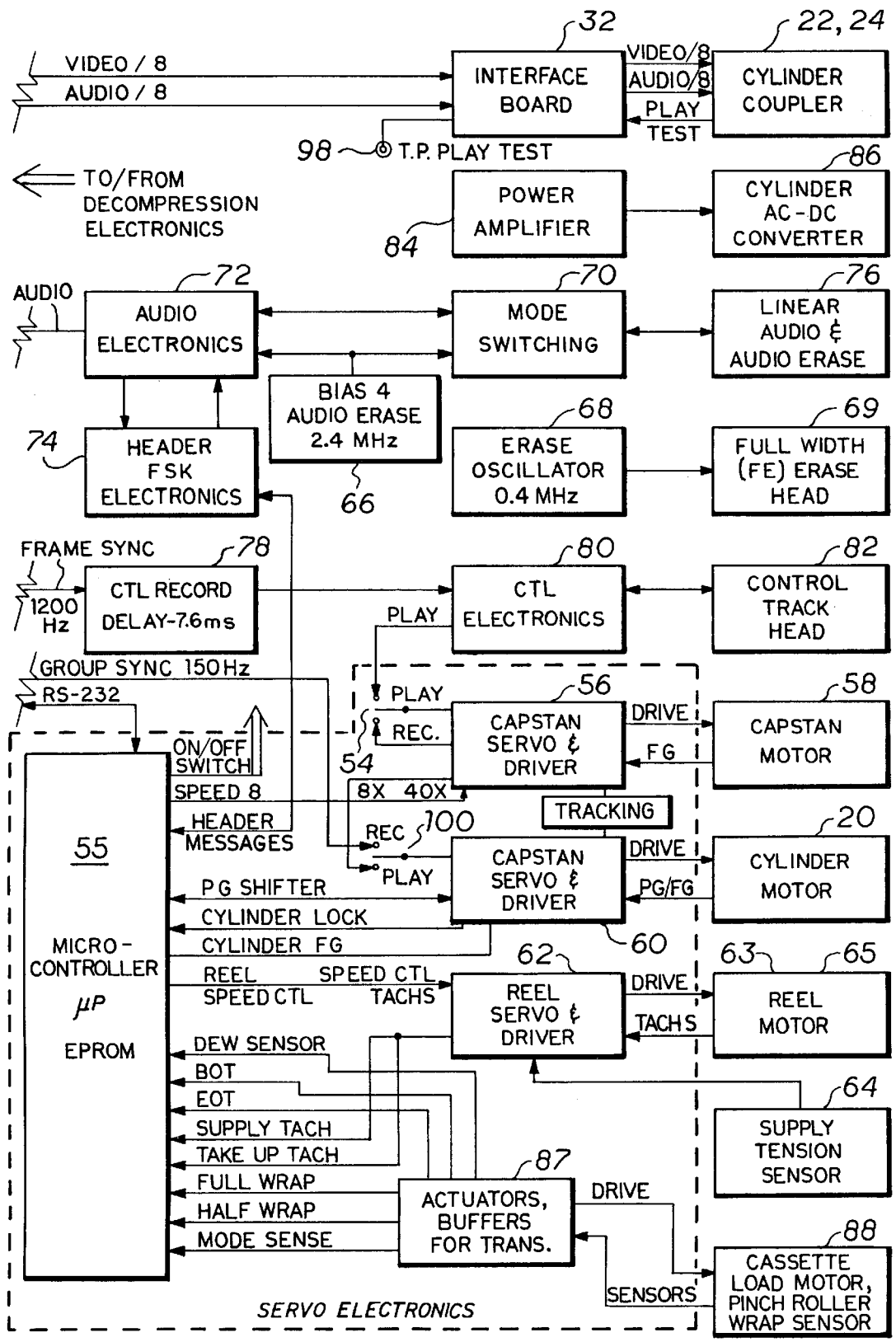
FIG. 2 is a block diagram of the elements of the recorder.
Figure 3:
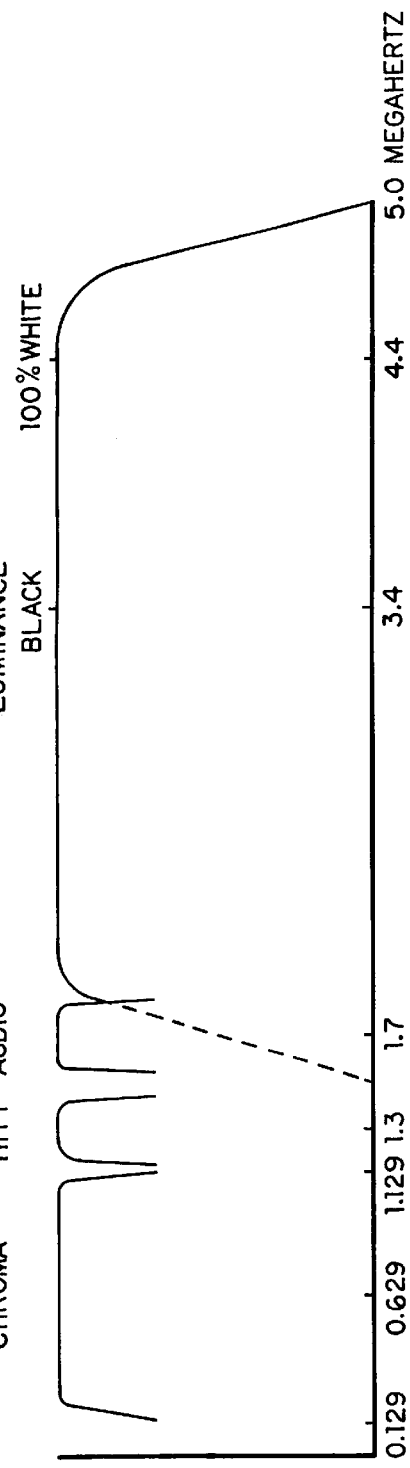
FIG. 3 is a graph of the recording spectrum of a standard VHS VCR.
Figure 4:
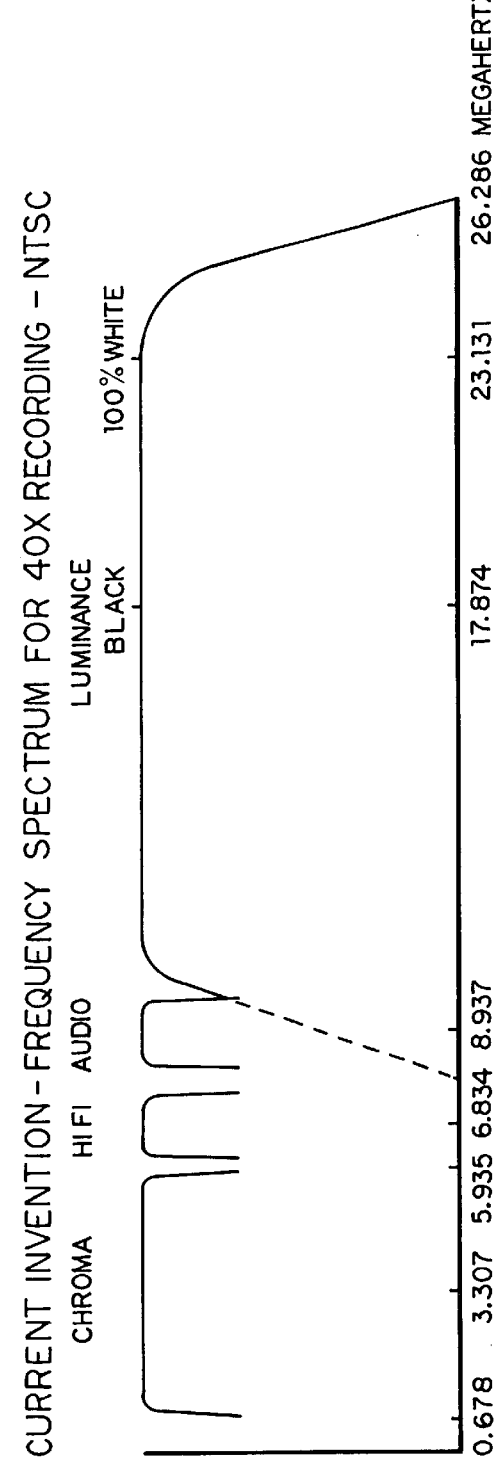
FIG. 4 is a graph of the recording spectrum of the 40× recorder.

Referring to FIG. 2, 8 modulated video signals and 8 modulated audio signals appropriately time interlaced are fed to an interface board 32 containing the buffer amplifiers with low impedance outputs to drive the stationary coupler 24. In FIG. 3, the frequency spectrum of the recorded luminance, chrominance, and audio of a standard speed playback VHS VCR is plotted. As the scanner 16 of the recorder of the invention is rotating at 5× normal angular speed, the frequency spectrum of the recorded signals from the enlarged drum described below are shifted upwards by a factor of slightly more than 5 as shown in FIG. 4. Interface board 32 feeds the modulated video and audio signals depicted in FIG. 4 to the capacitive coupler 22,24. Conventional rotary transformers cannot be used to couple the high frequencies to be recorded because of excessive inductance and cross talk leakage. Coaxial magnetic rotary transformers or coaxial capacitive couplers are possible signal transfer approaches, but are expensive to fabricate and accordingly not suitable for use in the present recorder.

Figure 5:
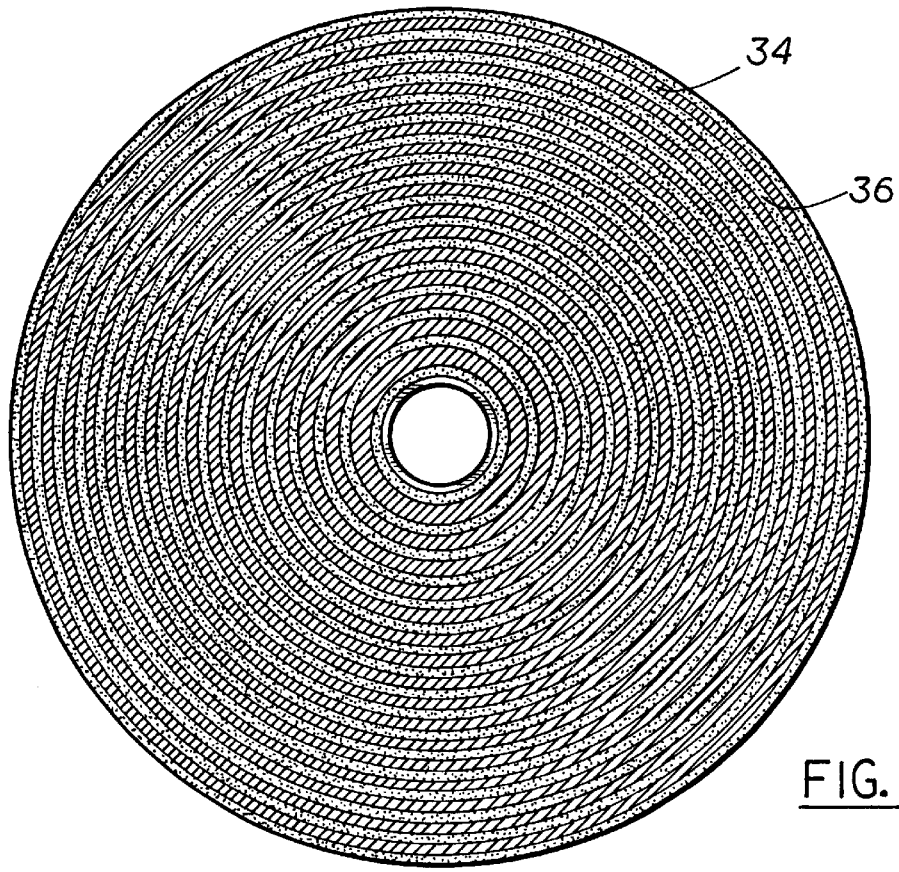
FIG. 5 is a drawing of the ring configuration of the capacitive coupler of the recorder.
Figure 6:
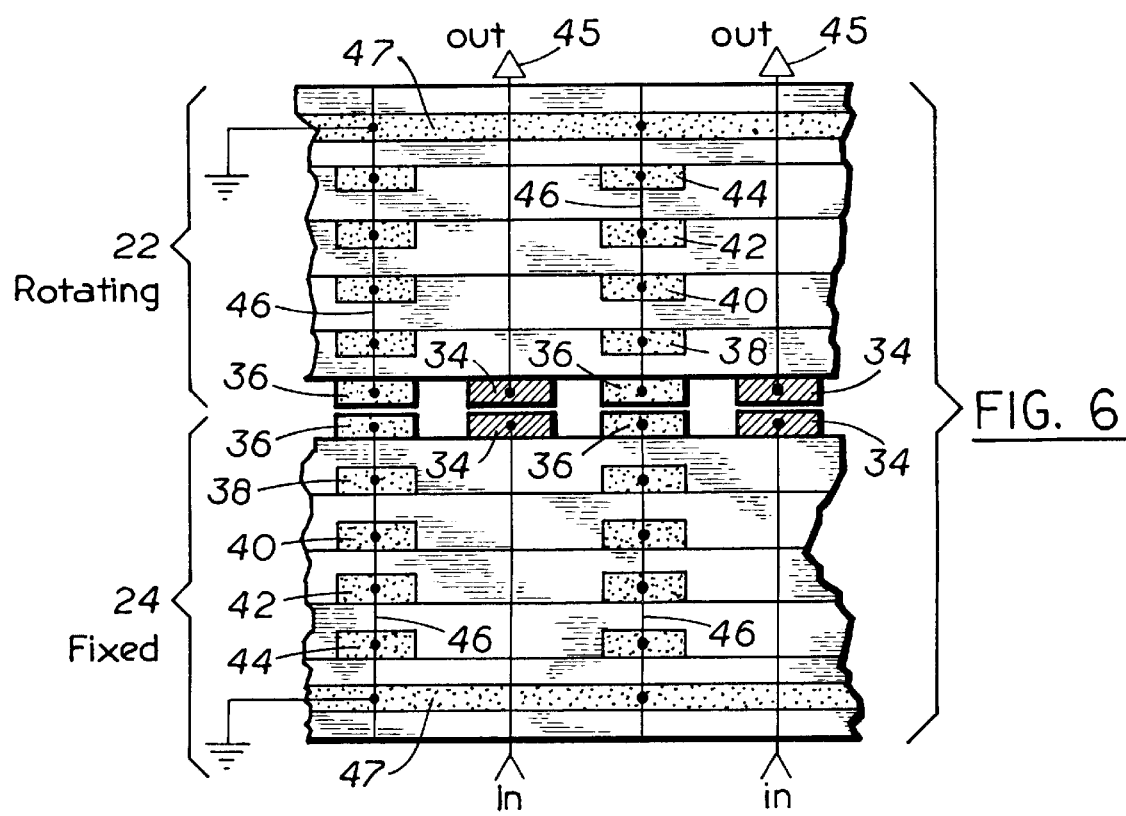
FIG. 6 is a drawing of the shielding technique employed in the capacitive coupler of the recorder.

The capacitive coupler 22,24 consists of two planar circular multi-layer boards of 16 active rings each, e.g. 34, and 17 guard rings, e.g. 36 as shown in FIG. 5. In the assembled coupler, the spacing between the boards is 1–2 mils. These boards are fabricated using inexpensive printed circuit board techniques. The area of the rings, eg. 34 are maintained equal in value throughout the structure by decreasing the width of each ring as the radius of the ring increases. In this manner, the capacitance of ring to opposing ring is maintained constant. The shielding provided by the guard rings, e.g. 36 may be appreciated by reference to FIG. 6. The coupler 22,24 is fabricated from two printed circuit boards having multiple layers. For example, 6 layers allow 5 shielding rings and a ground plane, as shown in FIG. 6. The capacitive rings e.g. 34 are laid down on the upper most board. Metallic rings 36–44 and ground plane 47 are laid down on the intermediate boards and constitute the shielding elements. A connection 46 runs through vias interconnecting the rings 36–44 and ground plane 47. In a second embodiment of the shielding, the metallic rings 38–44 are not employed, but the guard rings areas, e.g. 36 are peppered with 1400 pseudo-randomly drilled holes and wires are plated through the holes connecting with the ground plane 47, effectively surrounding each active ring, e.g 34, with a Faraday cage. Channel to channel crosstalk isolation of 46 db has been achieved using the Faraday cage embodiment. To present a high impedance load to the rotating capacitive coupler and a low impedance feed to the rotating head amplifiers of the scanner 16, 16 buffer amplifiers, e.g. 45, are mounted near the rotating ground plane board 47.

Figure 7:
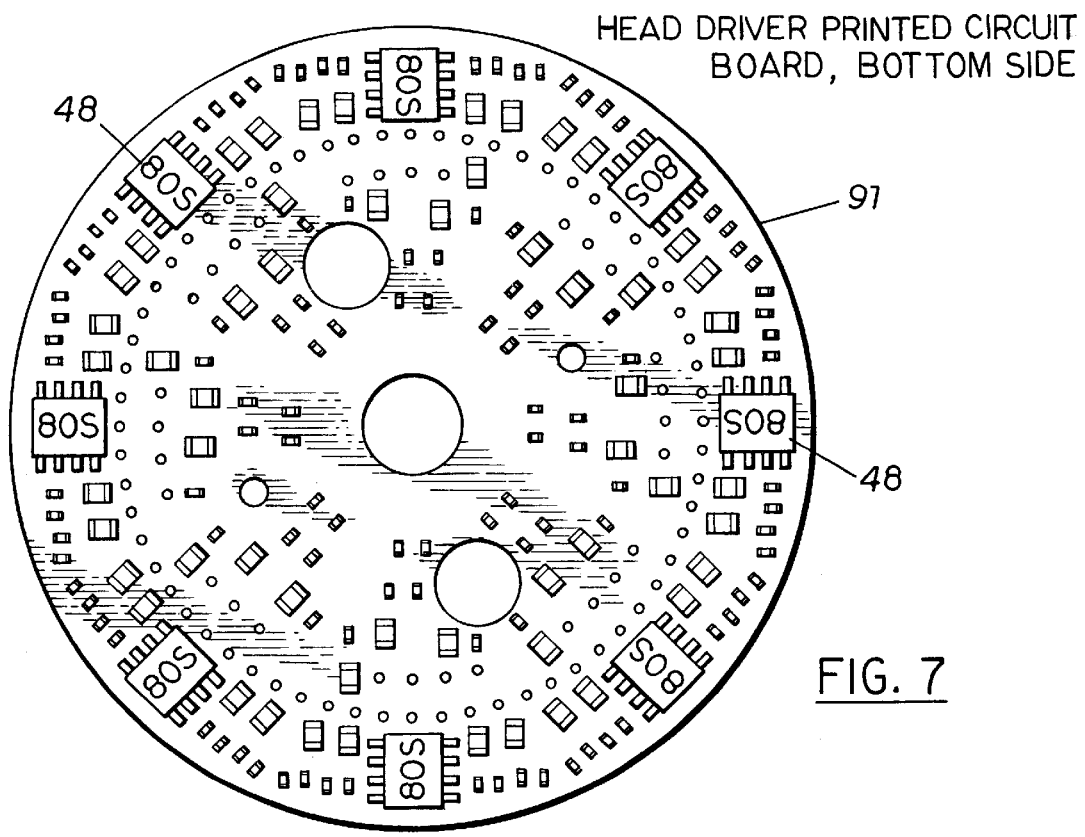
FIG. 7 is a layout drawing of the record amplifier board of the recorder.

The video and audio signals coupled through the capacitive coupler 22,24 feed the record amplifiers e.g. 48 (FIG. 7) mounted on the scanner 16. The record amplifiers e.g. 48 drive the 16 video heads, e.g. 50, and 16 audio heads e.g. 52 alternately mounted around the periphery of the scanner 16.

Figure 8:
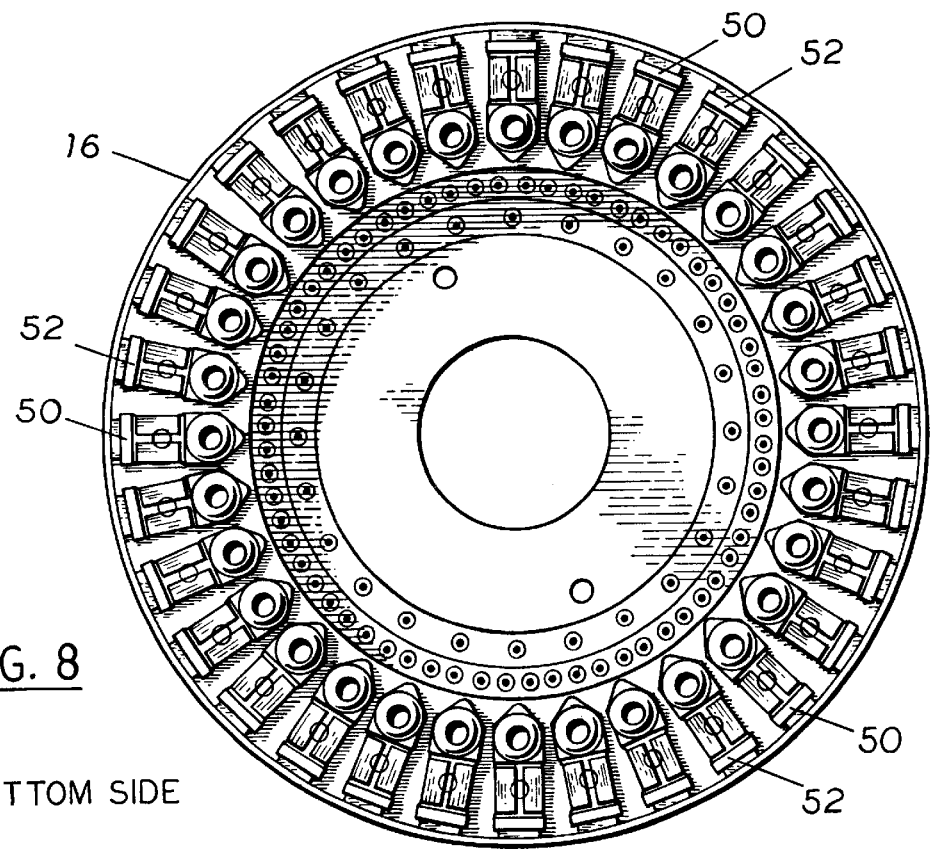
FIG. 8 is a drawing illustrating the heads of the scanner of the recorder.

(FIG. 8). The audio heads and the video heads are mounted on the scanner so that the respective gaps of each adjacent pair scan the same track even though they are displaced along the scanner periphery. It will be noted that, except for overscan described below, when a given head is in contact with the tape during a half rotation of the scanner, the head mounted 180 degrees away from the given head is not in contact with the tape but will be in contact during the next half rotation. Accordingly, each head and the head mounted 180 degrees from it have their windings connected in parallel, and the 32 heads are resultantly fed through the 16 rings of the capacitive coupler 22,24.

The diameter of the scanner is 67.636 mm compared to the nominal scanner diameter of 62 mm of the VHS standard playback VCR. The increased diameter results from the requirement of adding additional H lines and an 8 fold increase in longitudinal tape movement per revolution of the scanner. The number of added H lines is determined by the following two requirements: a) the phase jitter on all the horizontal sync pulses on all tracks must be extremely small. It is highly desirable that the H synch signals from all channels come from a single clock to ensure they are in phase. b) It is also a requirement of the NTSC spec than from one scan to the next there is an offset of ½H line at the place where the recording starts. To satisfy these requirements the number of H lines per track before switching to the next field must be an even integer (allows for the single clock) and when divided by 8 will be another even integer+0.5 exactly (allows for ½H line offset). When 13.5 H lines are added, the number of H lines per recorded field is 276 and 276/8= 34.500000 which meets the requirements of a) and b) above. 284 H lines would also be acceptable as 284/8=35.500000 but this results in a scanner diameter that is larger than it need be. The 67.636 mm diameter scanner with 13.5 H lines added is the smallest scanner meeting the above stated requirements, and it is the largest scanner that will fit into the standard VHS scanner's physical location.

The addition of H lines to a recorded field results in an increased scanner diameter as the additional lines must be laid down at the nominal rotational speed. This increases the slant length of the recorded field and consequentially the scanner periphery. Additionally, the 40× increase in linear tape speed, and the 5× increase in scanner rotational speed contribute to a necessary change of the helix angle of the scanner. FIG. 10 illustrates the applicable geometry and formulae required for calculating the requisite parameters for the 40× NTSC VHS recorder, where D2 is the required scanner diameter. FIG. 11 contains definitions of the length and angle designations of FIG. 10, and provides the results of the applicable calculation.

Referring again to FIG. 2, a 40× speed signal generated in a microcontroller 55 is fed to the capstan servo and driver unit 56 which drives the capstan motor 58. An encoder on the capstan motor 58 feeds back capstan motor speed to the capstan servo 56 which locks the capstan speed to the synch signal generated in the microcontroller 55. Similarly, an external synch signal generated in the MPEG-2 decompression engine provides a synch signal to the cylinder (i.e. scanner) servo and driver 60, and to the scanner motor 20. The encoder 30 (FIG. 1) feeds back speed and phase information to the servo 60 for control of the motor 20.

The Panasonic Model DS 850 recorder system has a 2 second start time in bringing the tape up to conventional VHS operating speed. The DS 850 supply reel servo can only provide hold back torque to the supply reel. Using the DS 850 mechanism start time at 40× speed would result in an unacceptably long leader of up to 80 second length when played back at standard speed. In bringing the tape up to 40× speed for recording, a short unrecorded leader of about 1 foot of tape is acceptable during the acceleration period. This rapid tape acceleration is implemented under control of the capstan motor 58 by a supply reel servo (part of 62) having positive control of the supply reel 63 in feeding tape to the drums 12,14. The supply reel servo's input signal is derived from a supply tension sensor 64, and the tape take up tension is maintained stable by a take up reel servo (part of 62) which is controlled by the instantaneous diameter of the take up reel. This diameter is sensed by measuring the angular velocity of the reels by tachometers mounted in the reel motors. To protect the edges of the tape, the high speed scanner 16 is not rotating during insertion of the cassette and the wrapping of the tape around the drums 12,14. Hence, initially there is no lubricating air film between the tape and the drums 12,14 until the scanner 16 starts to rotate. The supply and take up servos 62 provide the controlled forces required for rapid acceleration of the tape against the friction forces resulting from the wrap around the drums 12,14.

At standard VHS speed, edge track audio recording employs a bias frequency of 60 KHz, and the 60 KHz signal is also used for tape erasure by means of a full width erase head. In the 40× recorder, the audio bias and audio edge track erase frequency oscillator 66 is 2.4 MHz. Energy considerations preclude applying this high frequency bias oscillator signal to the full tape width erase head 69, and a separate oscillator 68 signal, within the range of 180 Khz to 400 KHz is used for full width erasure. The use of the disclosed erasure signal within the range of 180 KHz to 400 KHz leads to unexpected results. Unlike erasure signals below 180 KHz this erasure signal leaves no discernable video, audio or control artifacts on the tape after erasure, and unlike erasure signals above 400 KHz has no detrimental heating effects either on the tape or on the erase head. A mode switching circuit 70 applies either 40× audio signal plus 2.4 MHz bias for edge track audio recording from the electronics package 72, or enables playback of the header signal alone when required. The edge track audio head 76 has an inductance of 160 microhenries.

Prior to the start of video and audio recording, a header containing administrative information, such as messages expressing the total number of recordings for which the cassette has been used, may be recorded by a frequency keyed shift module 74.

A 1200 Hz frame synch signal from the decompression engine is applied to a delay unit 78 to provide a 7.6 ms delay mandated by the increased scanner diameter and is the control track signal which effectively provides "sprocket holes" which correctly positions the video heads of the correct azimuth over the appropriate track during 1× playback. An approximate 7.6 ms delay, resulting from the increased scanner diameter, of the normal audio must be provided in the decompression engine to insure lip synch with the picture. The frame synch is fed to the control track electronics 80 which drives the control track head 82. The inductance of the control track head 82 is approximately 1 mH, providing a rise time of 5 microseconds in recording the control signals to meet the SMPTE spec of a 200 microsecond rise time during normal speed recording.

As stated above, a rotary transformer 26,28 having ferrite cores of nominally 1 mil separation, feeds a 20 Khz ac signal from a power amplifier 84 to an ac-dc converter 86 which provides power to the record, playback and buffer amplifiers mounted on the scanner 16.

The microcontroller 55 programmed by an EPROM, controls the cassette loading motor, the wrapping of the tape around the drums 12,14 and scanner 16, and receives End of Tape, Beginning of Tape, wrap sensor signals and dew sensor signals from the transport. The microcontroller 55 in response to these sensor signals and stored program steps controls the actuators 87 of the cassette load motor and the tape wrap mechanism 88.

Attention has been directed above to the necessity of accurate tape guiding to assure stability of the envelopes of the recorded signals. Referring to FIG. 9, switches 90,92 located on the scanner 16 head amplifier board, are used to transfer the two heads which record the two outboard tracks of the eight video tracks, from record amplifiers (e.g. 48, FIG. 7) to playback amplifiers 94,96. A pre-recorded calibration tape having stable recorded envelopes is run at 40× speed through the recorder system and the playback signals are monitored at the test play jack 98 (FIG. 2). The tape guides of the transport are then adjusted to provide stable envelopes of the signals read through the temporary playback channels.

During this playback test procedure the external synch signals from the decompression engine are replaced by internally generated synch signals to drive the transport at 40× speed. The switches 54, 100 (FIG. 2) are set in the play position, and speed synchronizing signals from the microcontroller 55 are fed to the capstan servo driver 56 and, via switch 54, to the control track electronics 80, and to the cylinder driver servo 60 via switch 100.

The recorder of the present invention as disclosed above is a write-only machine (except for the test mode). It will be noted that the record amplifiers, e.g. 48, located on the scanner 16 may be replaced by playback amplifiers. This and other modifications, well known to those skilled in the art, such as deriving the control signals from the tape rather than from an external source will convert the machine to a 40× read-only device which may drive the disclosed write-only machine to effect a high speed tape duplicating system.

Table I recaps the parameters of the high speed recorder of the invention in comparison to the standard NTSC VHS recorder.

TABLE I

| | Normal Speed | High Speed |
|---|---|---|
| Linear Tape Speed | 1.31 ips (33.35 mm/s) | 52.4 ips (1.334 m/s) |
| Writing Speed | 228.5 ips (5.8 m/s) | 1201.26 (30.51 m/s) |
| Bandwidth | 129 KHz to 5.5 MHz | 678 Khz to 28.9 MHz |
| Octaves | 6 | 6 |
| Luminance BW | 3.4 to 4.4 MHz | 17.87 MHz to 23.13 MHz |
| Chrominance BW | 129 KHz to 1.129 MHz | 678 KHz to 5.94 MHz |
| FM audio subcarrier | (L) 1.3 MHz (R) 1.7 MHz | (L) 6.8 MHz (R) 8.9 MHz |
| Scanner rotation | 1800 RPM | 9000 RPM |
| Scanner helix angle | 5° 56' 7.4" | 5° 43' 12" |
| Scanner diameter | 62 ± 0.01 mm | 67.636 mm |
| Number of heads | 4 | 32 |
| Video head spacing | 180° | 22.5° |
| Audio head spacing | 180° | 22.5° |
| Number transformer rings | 4 | 16 |

What is claimed is:

1. Apparatus for recording multiple parallel analog video and audio signal channels onto a cassette loaded magnetic tape for playback on a standard helical scan playback unit, said audio signal channels synchronously related to said video signal channels, said apparatus comprising:

a) means for recording said video signal channels in a helical scan format on said tape, b) means for recording said audio signal channels onto said tape in a helical scan format, wherein said audio signals are recorded in synchronism with said video signals, and c) means for recording at a tape speed greater than 4 times the playback tape speed of said standard playback unit, d) a fixed upper cylinder and an axially aligned fixed lower cylinder, whereby said tape partially wraps said cylinders during recording, e) a rotatable scanner axially positioned between said cylinders, said scanner having alternately spaced around its periphery multiple video record heads and multiple audio record heads, wherein the number of said video record heads equals 2n and the number of said audio record heads equals 2n, where n is the number of said multiple video signal channels and n is the number of said multiple audio signal channels being recorded, whereby said tape wrapping said cylinders is contacted by said video record heads and said audio record heads for slant recording on said tape during rotation of said scanner, f) a time delay for delaying said audio channel prior to recording, whereby a segment of video information is recorded on top of the segment of recorded audio information synchronous with said video segment, and g) a means for accepting a group synch signal from an external source generating said video signal channels and said audio signal channels, wherein said scanner is locked to said group synch signal.

2. The apparatus of claim 1 wherein said means for recording at a speed greater than the 4 times tape speed of said standard helical scan playback unit comprises:

a) a scanner driver for rotating said scanner at a rotary speed t times the rotary speed of the scanner of said standard playback unit, and b) a capstan driver for moving said tape at a linear speed s equal to n×t times the linear speed of said standard playback unit.

3. The apparatus of claim 2 including a tape reeling system comprising:

a) a supply reel motor having a first tachometer attached thereto whereby the rotational speed of said supply reel motor is measured, b) a takeup reel motor having a second tachometer attached thereto whereby the rotational speed of said takeup reel motor is measured, c) first and second servo drivers fed from said first and said second tachometers, and d) tension transducer in contact with said tape for supplying tape tension information to said first and said second servo drivers.

4. The apparatus of claim 1 wherein said means for recording multiple parallel video and audio signal channels includes a signal coupler comprising:

a) a rotary member comprising a multiplicity of parallel non electrically conductive planar layers, b) a plurality of circularly concentric electrically conductive guard rings located on each of said parallel planar layers, each of said layers having thereon an identical concentric pattern of said guard rings with the corresponding guard rings of each layer in registration, c) a ground plane located on a first outboard layer of said multiplicity of parallel non electrically conductive planar layers, d) first electrical conductors passing through and connected to said guard rings on said planar layers and further connected to said ground plane, whereby each of said conductors connect each of said guard rings of the same radius to said ground plane, e) a multiplicity of circularly concentric electrically conductive signal rings located on a second outboard layer of said multiplicity of parallel non electrically conductive layers, said signal rings being interleavedly positioned between the locations of said guard rings on said layer, f) second electrical conductors connected to said signal rings on said second outboard layer wherein said conductors connect each of said signal rings to individual output terminal points, g) a stationary member axially aligned with said rotary member, said stationary member substantially having the same structure as said rotary member, wherein said stationary member also comprises a plurality of planar layers each having concentric electrically conductive guard rings and signal rings, said rings of said stationary planar member being geometrically congruent to said corresponding rings of said rotary member, and positioned in said stationary member in equivalent locations to those of said rotary member, guard ring for guard ring and signal ring for signal ring, wherein said guard rings are electrically connected to a ground plane of said stationary member, and said signal rings are electrically connected to input terminal points of said stationary member, further wherein said signal rings of said rotary member and said signal rings of said stationary member are axially aligned in non contacting facial opposition, input signals applied to said stationary signal rings are capacitively coupled through said signal rings of said rotary member to said output terminals, and whereby said interconnected stationary member guard rings and said interconnected rotary member guard rings serve as Faraday cages shielding said signal rings from outside electrical interference.

5. The capacitive coupler of claim 4 wherein said signal rings are of equal areas, whereby the capacitive load of said signal rings is equalized.

6. The capacitive coupler of claim 4 wherein FET amplifiers are located at said first outboard layer of said rotary member for connection to said output terminals.

7. The capacitive coupler of claim 4 wherein said outermost guard rings of said rotary member and said stationary member are disconnected from said ground planes and are connected to signal terminals wherein a reproduce signal may be played back from said scanner through said guard rings.

8. The apparatus of claim 1 wherein said tape is wrapped around said fixed upper and said fixed lower cylinders before starting rotation of said scanner, whereby said heads are prevented from striking and damaging the edges of said tape.

9. The apparatus of claim 1 further comprising means of recording administrative information on a header of said tape, whereby identification information and information relative to the number of times said tape has been used is recorded on said header.

10. The apparatus of claim 2 wherein said recorded format is the VHS format.

11. The apparatus of claim 9 wherein n equals 8, and t equals 5, whereby said tape speed s equals 40 times the playback speed of said standard playback unit.

12. The apparatus of claim 11 wherein the number of recorded horizontal lines H in a half revolution of said scanner divided by n is greater than the industry NTSC standard of 271.5 lines, and is an integer number plus 0.5.

13. The apparatus of claim 12 wherein said fixed upper cylinder and said fixed lower cylinder have the minimum diameter of 67.636 mm wherein the number of horizontal H lines recorded in a half rotation of said scanner for 8 sets of parallel heads and a tape speed s equal to 40 times said tape speed of said standard playback unit is 276.

14. The apparatus of claim 9 wherein said apparatus further comprises a full width erase head driven by an oscillator signal with a frequency between 180–400 KHZ.

15. The apparatus of claim 9 further comprising means to limit the rise/fall time of control track signal recorded on said tape whereby the flux pattern on said tape conforms to the VHS industry standard.

16. The apparatus of claim 2 wherein said format is the PAL format.

17. The apparatus of claim 16 wherein the number of recorded horizontal lines H' in a half revolution of said scanner divided by n is greater than the PAL industry standard, and is an integer number plus 0.5, with the minimum number equal to 324.

18. The apparatus of claim 2 wherein said format is the SECAM format.

19. The apparatus of claim 18 wherein the number of recorded horizontal lines H" in a half revolution of said scanner divided by n is greater than the SECAM industry standard, and is an integer number plus 0.5, with the minimum number equal to 324.

20. The method of recording high speed analog video signals and associated analog audio signals, comprising the steps of:

a) accepting n parallel channels of said high speed video and n parallel channels of said high speed audio signals from an outside source, b) feeding said n video signals to a first group of n stationary signal rings of a capacitive coupler, c) feeding said n audio signals to a second group of n stationary signal rings of said capacitive coupler, d) coupling said n video signals through a first group of n rotary signal rings facially opposed to said stationary rings of said capacitive coupler, e) coupling said n audio signals through a second group of n rotary signal rings facially opposed to said stationary rings of said capacitive coupler, f) providing electrical shielding of said signal rings by means of grounded guard rings located proximate said signal rings of said capacitive coupler, g) wrapping a tape about two fixed helical scan cylinders, h) rotating a scanner coaxial with, and located between, said cylinders, said scanner having 2n peripherally mounted video heads interleaved with 2n peripherally mounted audio heads for recording on said tape, said scanner rotating at a speed t times the speed of a standard video playback apparatus scanner, i) applying said each of said n coupled video signals to 2 each of said video heads, said 2 heads driven in parallel, j) delaying said n coupled audio signals by a fixed time delay, k) applying each of said n coupled time delayed audio signals to 2 each of said audio heads, said 2 heads driven in parallel, l) moving said tape at a speed n×t times the tape speed of a standard video playback unit, whereby said video signals and said audio signals are recorded on said tape in a standard helical scan format at high speed.

* * * * *